US012631047B2

(12) United States Patent
Liang et al.

(10) Patent No.: US 12,631,047 B2
(45) Date of Patent: May 19, 2026

(54) RESET AUXILIARY STRUCTURE FOR CIPHER WHEEL LOCKS

(71) Applicant: XIAMEN MAKE IOT TECHNOLOGY CO., LTD, Xiamen (CN)

(72) Inventors: Fusheng Liang, Xiamen (CN); Shaolian Lin, Xiamen (CN)

(73) Assignee: XIAMEN MAKE IOT TECHNOLOGY CO., LTD, Xiamen (CN)

( * ) Notice: Subject to any disclaimer, the term of this patent is extended or adjusted under 35 U.S.C. 154(b) by 38 days.

(21) Appl. No.: 18/908,815

(22) Filed: Oct. 8, 2024

(65) Prior Publication Data

US 2025/0027338 A1 Jan. 23, 2025

Related U.S. Application Data

(63) Continuation-in-part of application No. PCT/CN2022/105225, filed on Jul. 12, 2022.

(30) Foreign Application Priority Data

Jul. 8, 2022 (CN) ......................... 202210798255.1

(51) Int. Cl.
*E05B 37/00* (2006.01)
*E05B 37/02* (2006.01)

(52) U.S. Cl.
CPC .......... *E05B 37/0048* (2013.01); *E05B 37/02* (2013.01)

(58) Field of Classification Search
CPC ............. E05B 37/0031; E05B 37/0048; E05B 37/0058; E05B 37/0075; E05B 37/0079; E05B 37/0082; E05B 37/02
See application file for complete search history.

(56) References Cited

U.S. PATENT DOCUMENTS

| | | | | |
|---|---|---|---|---|
| 7,958,757 | B1 * | 6/2011 | Lee | E05B 13/103 70/284 |
| 9,758,989 | B1 * | 9/2017 | Simpson | E05B 37/0058 |
| 10,030,415 | B2 * | 7/2018 | Taylor | E05B 37/0034 |
| 10,041,275 | B2 * | 8/2018 | Wu | E05B 37/02 |

(Continued)

FOREIGN PATENT DOCUMENTS

| | | | | |
|---|---|---|---|---|
| CN | 110374406 A | * 10/2019 | | E05B 37/0048 |
| CN | 111188535 A | * 5/2020 | | E05B 37/0048 |

(Continued)

*Primary Examiner* — Kristina R Fulton
*Assistant Examiner* — Noah Horowitz

(57) ABSTRACT

A reset auxiliary structure for cipher wheel locks includes a knob; a cipher wheel assembly rotatable to the knob; a reset cam; and an auxiliary guide block. The knob is centrally provided with a receiving chamber for accommodating the cipher wheel assembly. The cipher wheel assembly includes a positioning piece, which is provided with a shifting lever. The reset cam is synchronously rotatable to the knob. The reset cam includes a reset surface and a guide surface that are connected. The guide surface is located beside the reset surface, and the reset surface is positioned at the highest point of the reset cam. The auxiliary guide block is movable to the reset cam. The support surface of the auxiliary guide block is positioned beside the reset surface. The shifting lever is connected with the reset cam.

9 Claims, 14 Drawing Sheets

(56) References Cited

U.S. PATENT DOCUMENTS 10,156,087 B2 * 12/2018 Yu ........................ E05B 65/0092
12,110,712 B2 * 10/2024 Li ........................... E05B 37/02
12,320,152 B2 * 6/2025 Li ........................ E05B 37/0034
12,371,926 B2 * 7/2025 Hartmann ........... E05B 37/0034

FOREIGN PATENT DOCUMENTS

CN 217735147 U * 11/2022
CN 117328744 A * 1/2024 ............. E05B 37/02

* cited by examiner

RESET AUXILIARY STRUCTURE FOR CIPHER WHEEL LOCKS

TECHNICAL FILED

The present invention relates to a reset auxiliary structure for cipher wheel locks.

BACKGROUND

Cipher wheel locks combine the convenience of electronic locks with the stability of key mechanical locks, making them widely used in the market. However, the password of the current cipher wheel locks on the market remains unchanged between resets, making them difficult to use in places with high population turnover, such as shopping malls and bathhouses. Additionally, the correct password is displayed during both unlocking and locking, requiring the user to manually scramble the password to prevent leakage, which is inconvenient to operate. After improvement, specifically referencing Chinese Patent No. 201922402453.8, titled "A Cipher Wheel Lock," the main technical feature is a cam mechanism variable code lock, relying on a gradual reset cam to ultimately drive the cipher wheel to change the code. However, in practice, due to the limited travel of the lock switch, the width of the highest point of the gradual reset cam is relatively small, resulting in a very short code change travel for the cipher wheel. The cipher wheel may overshoot due to inertia, leading to unstable and inaccurate code changes. For example, during automatic resetting, the cipher wheel should return to 0000, but due to the aforementioned instability and inaccuracy, these cipher wheels may fail to stably change the code, potentially jumping from "0" to an adjacent "1" or "9," failing to provide users with a stable cipher wheel code-changing experience.

SUMMARY

To address the above technical problems, the object of the present invention is to provide a reset auxiliary structure for cipher wheel locks.

The present invention is achieved through the following technical solution:

A reset auxiliary structure for cipher wheel locks, including a knob; a cipher wheel assembly that is rotatable relative to the knob; a reset cam; and an auxiliary guide block. The knob is provided with a receiving chamber in the middle for accommodating the cipher wheel assembly. The cipher wheel assembly includes a positioning piece. The positioning piece is provided with a shifting lever. The reset cam can rotate synchronously with the knob. The reset cam includes a reset surface and a guide surface that are connected. The guide surface is located beside the reset surface. The reset surface is positioned at the highest point of the reset cam. The auxiliary guide block is capable of moving relative to the reset cam. The support surface of the auxiliary guide block can be positioned beside the reset surface. The shifting lever is operatively connected with the reset cam. After being tilted by the guide surface, the shifting lever engages with the reset surface and the support surface of the auxiliary guide block.

In the embodiment of the present invention, the reset cam includes the reset surface located at the highest point, with the guide surfaces on both sides of the reset surface for driving the shifting lever to tilt.

In the embodiment of the present invention, the side wall of the auxiliary guide block can be in abutting engagement with the side wall of the shifting lever, causing the auxiliary guide block to displace relative to the reset cam when the shifting lever tilts on the guide surface.

In the embodiment of the present invention, the reset auxiliary structure further includes a turntable that can rotate relative to the reset cam; the auxiliary guide block is connected to the turntable.

In the embodiment of the present invention, the knob includes a base plate; the turntable is rotatably connected to the base plate; and the reset cam is arranged on the base plate.

In the embodiment of the present invention, the base plate is provided with a connection slot; the turntable is provided with a limiting protrusion; and the limiting protrusion positioned within the connection slot.

In the embodiment of the present invention, the peripheral side of the turntable is provided with a limiting groove; the base plate is provided with a limiting block; the cooperation between the limiting block and the limiting groove restricts the rotational angle of the turntable.

In the embodiment of the present invention, a pin shaft is provided on the base plate. The turntable is fitted over the pin shaft. The middle of the pin shaft is provided with a connection hole; and a fixing bolt is fitted within the connection hole. The turntable is connected to the knob through the cooperation of the fixing bolt and the connection hole.

In the embodiment of the present invention, the turntable is positioned at the center of the base plate. The reset cam is located on the outer periphery of the turntable. The auxiliary guide block is located on the inner periphery of the reset cam.

In the embodiment of the present invention, the reset surface of the reset cam and the support surface of the auxiliary guide block can simultaneously engage with the shifting lever.

In the embodiment of the present invention, the positioning piece includes a rotating shaft. The positioning piece is rotatable relative to the cipher wheel assembly when tilted by the cooperation between the shifting lever and the reset cam.

In the embodiment of the present invention, the rotating shaft is located on the outer periphery of the reset cam.

In the embodiment of the present invention, the lower end of the guide surface is connected to the base plate. The guide surface is a curved surface.

The reset auxiliary structure for cipher wheel locks of the present invention has the following advantages:

Based on the reset cam structure of the lock body in the prior art, the auxiliary guide block is axially fixed to the base plate of the lock body. The auxiliary guide block can rotate radially within a certain angle, limiting its axial movement and preventing any vertical motion.

During the unlocking process, the reset cam drives the positioning piece, which in turn drives the cipher wheel cam to sequentially and gradually change the code. When the reset cam reaches its highest point, the cipher wheel cam reaches its lowest point, achieving the desired code change effect. Due to the rotational inertia during the cipher wheel's movement, the auxiliary guide block and the shifting lever then engage, causing the positioning piece to maintain a reset state for a longer period, thereby achieving a delayed code change, resulting in a more stable and accurate code change for the cipher wheel.

During the locking process, the reset cam drives the positioning piece, which in turn drives the cipher wheel cam to sequentially and gradually change the code, while also driving the auxiliary guide block to its limit position. When the reset cam reaches its highest point, the auxiliary guide block then engages to delay the code change, making the cipher wheel's code change more stable and accurate.

BRIEF DESCRIPTION OF THE DRAWINGS

To more clearly illustrate the technical solution of the present invention, a brief introduction to the drawings used in the embodiments or the description of the prior art is provided below. It is evident that the following drawings are merely some embodiments of the present invention. For those skilled in the art, other drawings can be obtained based on these drawings without creative effort.

DETAILED DESCRIPTION OF THE EMBODIMENTS

Figure 1:
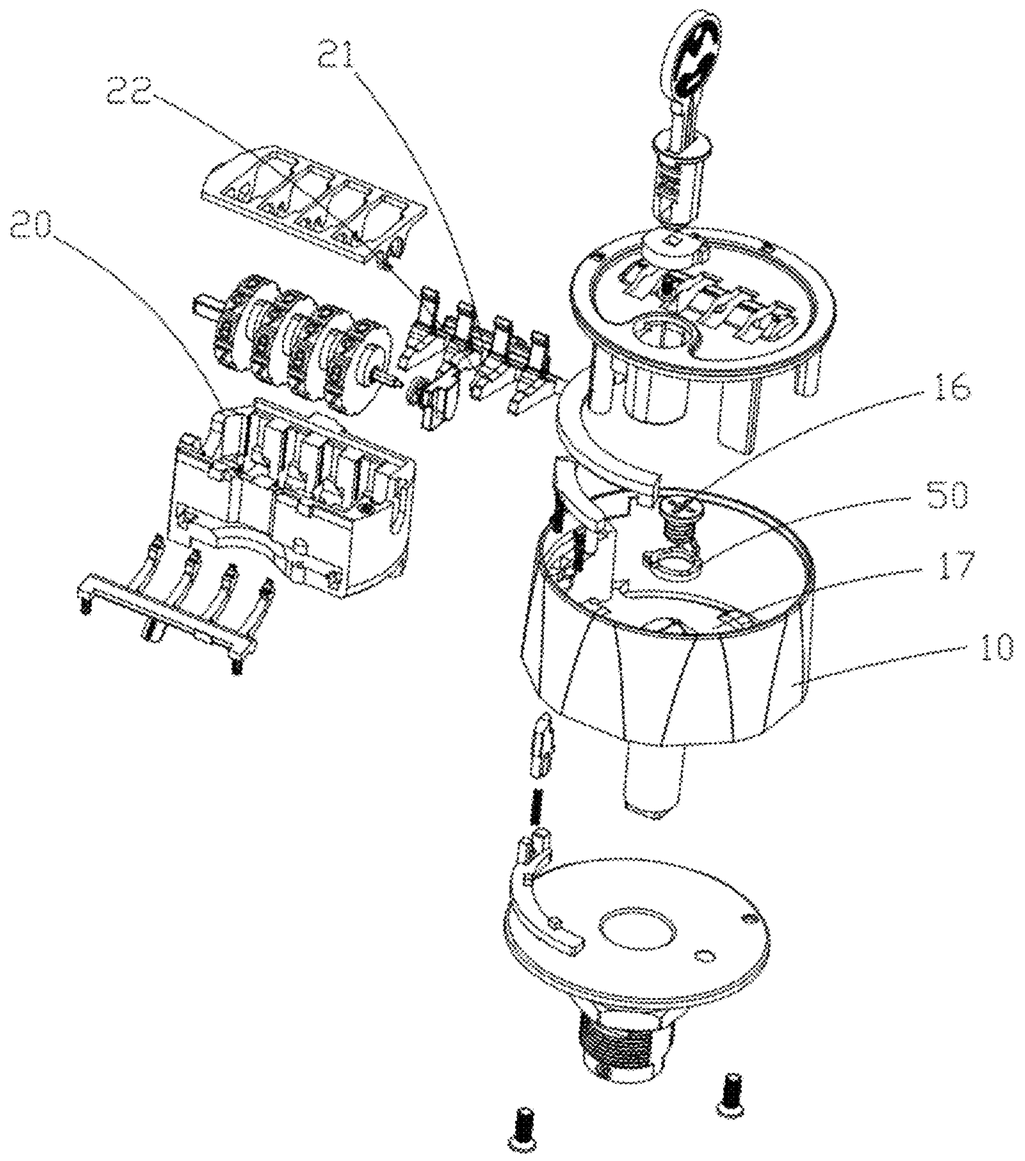
FIG. 1 is an exploded view of the present invention.

To make the objectives, technical solutions, and advantages of the embodiments of the present invention clearer, the technical solutions in the embodiments of the present invention will be described clearly and comprehensively in conjunction with the accompanying drawings. It is evident that the described embodiments represent some, but not all, of the embodiments of the present invention. Based on the embodiments of the present invention, all other embodiments obtained by those skilled in the art without creative effort fall within the scope of protection of the present invention. Therefore, the following detailed description of the embodiments of the present invention provided in the accompanying drawings is not intended to limit the scope of the claimed invention but merely represents selected embodiments of the present invention. All other embodiments obtained by those skilled in the art without creative effort, based on the embodiments of the present invention, are within the scope of protection of the present invention.

In the description of the present invention, it should be understood that terms such as "center," "longitudinal," "transverse," "length," "width," "thickness," "upper," "lower," "front," "rear," "left," "right," "vertical," "horizontal," "top," "bottom," "inner," "outer," "clockwise," "counterclockwise," and similar indications of position or direction are based on the positions or orientations shown in the drawings. These terms are used for convenience in describing the invention and simplifying the description and are not intended to indicate or imply that the device or element referred to must have a specific orientation, be constructed in a specific orientation, or operate in a specific orientation. Therefore, these terms should not be construed as limiting the present invention.

Moreover, terms such as "first" and "second" are used for descriptive purposes only and should not be interpreted as indicating or implying relative importance or implicitly specifying the number of technical features indicated. Thus, features defined as "first" or "second" may explicitly or implicitly include one or more of these features. In the description of the present invention, the term "multiple" means two or more unless otherwise specifically defined.

In the present invention, unless otherwise clearly specified and defined, the terms "install," "attach," "connect," "fix," and similar terms should be understood in a broad sense. For example, they may refer to a fixed connection, a detachable connection, or an integral connection; they may refer to a mechanical connection or an electrical connection; they may refer to a direct connection or an indirect connection through an intermediary. They may refer to internal communication between two elements or an interaction relationship between two elements. For those skilled in the art, the specific meanings of the above terms in the present invention can be understood according to specific situations.

In the present invention, unless otherwise clearly specified and defined, the first feature being "above" or "below" the second feature may include direct contact between the first and second features, or it may include the first and second features not being in direct contact but in contact through another feature between them. Moreover, the first feature being "above," "over," or "on" the second feature includes the first feature being directly or diagonally above the second feature or merely indicating that the first feature is at a higher horizontal level than the second feature. The first feature being "below," "under," or "beneath" the second feature includes the first feature being directly or diagonally below the second feature or merely indicating that the first feature is at a lower horizontal level than the second feature.

Referring to the accompanying drawings, a reset auxiliary structure for cipher wheel locks includes a knob 10, a cipher wheel assembly 20 that is rotatable relative to the knob 10, a reset cam 30, and an auxiliary guide block 40. The knob 10 is centrally provided with a receiving chamber 17 for accommodating the cipher wheel assembly 20. During use, the cipher wheel assembly 20 remains stationary, and locking and unlocking are performed by rotating the knob 10. The reset function of the cipher wheel assembly 20 in this invention (as shown, using a four-digit code, which can be reset to all zeros, forming 0000) is not elaborated upon here, as it can be specifically referenced in the background technology provided in Chinese Patent No. 201922402453.8, titled "A Cipher Wheel Lock." The cipher wheel assembly 20 includes a positioning piece 21. The positioning piece 21 is provided with a shifting lever 22. The reset cam 30 is capable of rotating synchronously with the knob 10. When locking or unlocking, the rotation of the knob 10 drives the reset cam 30 to rotate along with knob 10, allowing the rest cam 30 to engage with the shifting lever 22. The reset cam 30 includes a reset surface 31 and a guide surface 32 that are connected. The guide surface 32 is located beside the reset surface 31. The reset surface 31 is positioned at the highest point of the reset cam 30. The auxiliary guide block 40 is movable relative to the reset cam 30. The support surface of the auxiliary guide block 40 can be positioned beside the reset surface 31, preferably located at the upper end of the auxiliary guide block 40. The shifting lever 22 engages with the reset cam 30. After being tilted by the guide surface 32, the shifting lever 22 can be connected to the reset surface 31 and the support surface 41 of the auxiliary guide block 40. In this invention, when the knob 10 is rotated, the reset cam 30 engages with the shifting lever 22, thereby allowing the guide surface 32, reset surface 31, and shifting lever 22 to interact. This interaction causes the shifting lever 22 to rise or fall without rotating. Simultaneously, as the shifting lever 22 moves, the shifting lever 22 engages with the auxiliary guide block 40, allowing the auxiliary guide block 40 to remain stationary just like the shifting lever 22, without rotating.

In a preferred embodiment of the present invention, the reset cam 30 includes a reset surface 31 located at the highest point. The guide surfaces 32 are located on both sides of the reset surface 31 for driving the shifting lever 22 to tilt. In one embodiment, the two guide surfaces 32 may be symmetrically arranged relative to the reset surface 31. During the locking or unlocking process, the shifting lever 22 moves from the guide surface 32 on one side to the guide surface 32 on the other side. In this process, the auxiliary guide block 40 initially does not rotate with the knob 10. As the knob continues to rotate, the auxiliary guide block 40 will eventually rotate synchronously with the knob 10, as described in more detail below.

The side wall of the auxiliary guide block 40 can be in abutting engagement with the side wall of the shifting lever 22, causing the auxiliary guide block 40 to displace relative to the reset cam 30 when the shifting lever 22 tilts on the guide surface 32.

The invention further includes a turntable 50. The turntable 50 is rotatable relative to the reset cam 30. The auxiliary guide block 40 is connected to the turntable 50. In one embodiment, the auxiliary guide block 40 is rotatable synchronously with the turntable 50. The turntable 50 can rotate synchronously with the knob 10 (or the reset cam 30) under the influence of external force, or the turntable 50 may rotate independently of the knob 10.

Furthermore, the knob 10 in the present invention includes abase plate 11. The turntable is rotatably connected to the base plate. The reset cam 30 is arranged on the base plate 11. The knob 10, the base plate 11, and the reset cam 30 are integrally formed. The rotation of the knob 10 synchronizes with the rotation of the base plate 11 and reset cam 30. The turntable 50 can either rotate synchronously with the knob 10 under the influence of external force or remain stationary.

In the first embodiment of the present invention, the base plate 11 is provided with a connection slot 12, preferably an arc-shaped slot. The turntable 50 is provided with a limiting protrusion 51. The limiting protrusion 51 is positioned within the connection slot 12. In other words, the cooperation between the connection slot 12 and the limiting protrusion 51 allows for the auxiliary guide block 40 and knob 10 to have independent rotational travel. When the rotational angle of the knob 10 reaches the arc angle of the connection slot 12, further rotation of the knob 10 will cause the auxiliary guide block 40 (or the turntable 50) to start rotating synchronously with the knob 10.

Figure 13:
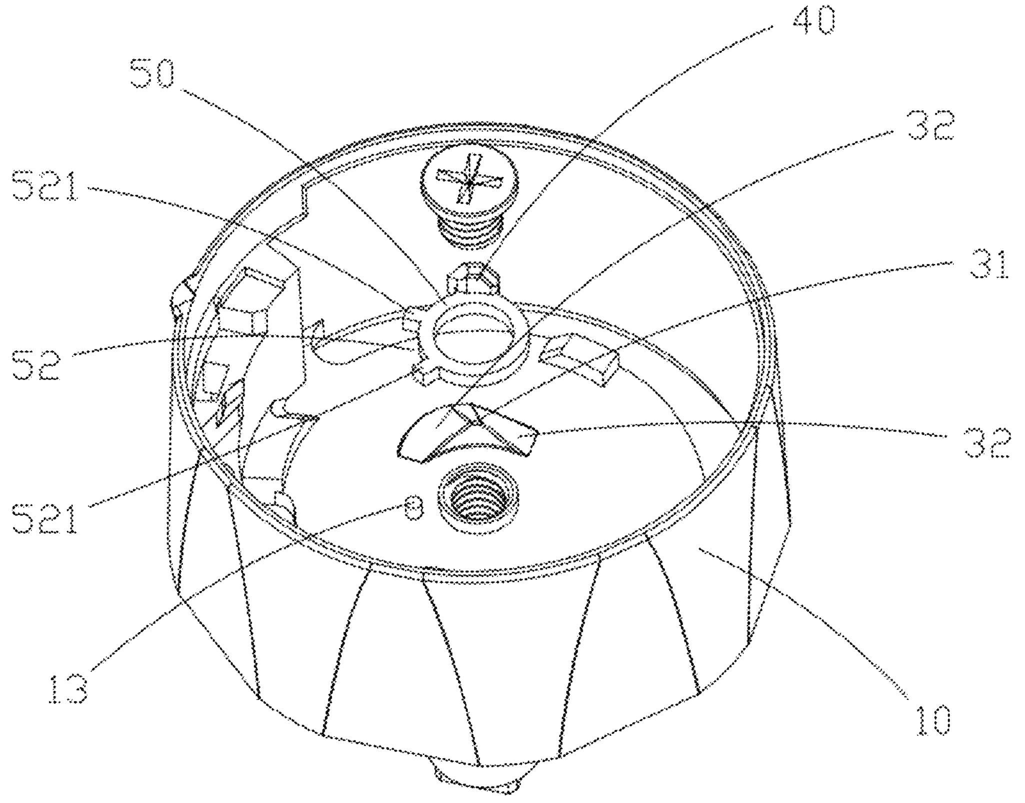
FIG. 13 is a schematic diagram of the rotation limitation of the turntable in the present invention.
Figure 14:
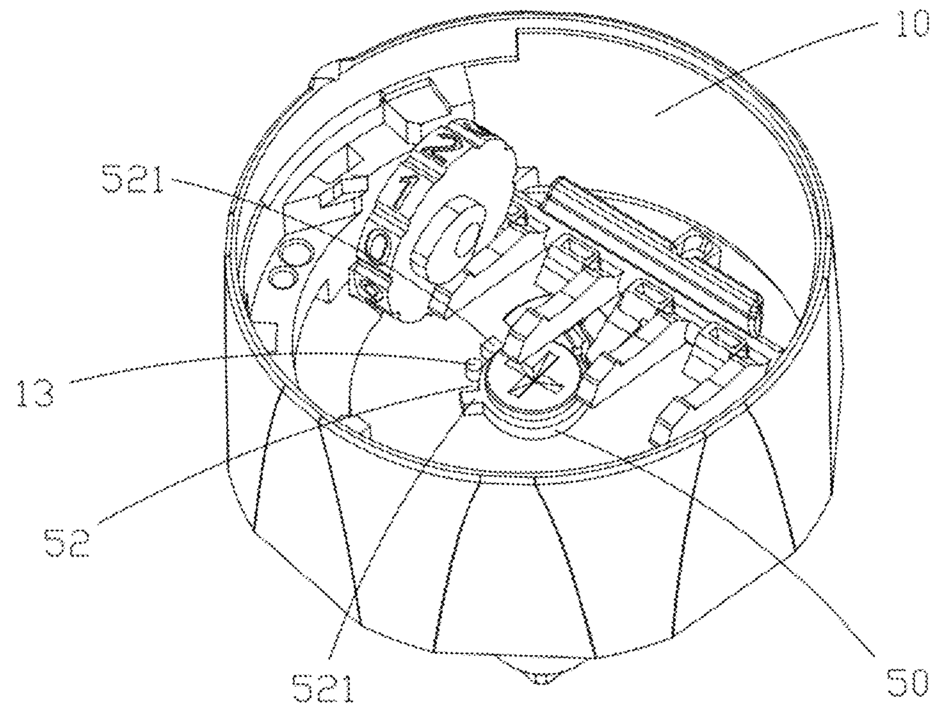
FIG. 14 is a usage schematic diagram of the rotation limitation of the turntable in the present invention.

In the second embodiment of the present invention, the peripheral side of the turntable 50 is provided with a limiting groove 52, preferably an arc-shaped groove. The base plate 11 is provided with a limiting block 13. The cooperation between the limiting block 13 and the limiting groove 52 restricts the rotational angle of the turntable 50. As mentioned above, the cooperation between the limiting groove 52 and the limiting block 13 allows for the independent rotational travel of the auxiliary guide block 40 and knob 10. When the rotational angle of the knob 10 reaches the arc angle of the limiting groove 52, further rotation of the knob 10 will cause the auxiliary guide block 40 (or the turntable 50) to start rotating synchronously with the knob 10. For specific details, refer to FIGS. 13 and 14. The limiting groove 52 is formed between two protrusions 521 which are located on the outer periphery of the turntable 50.

Figure 3:
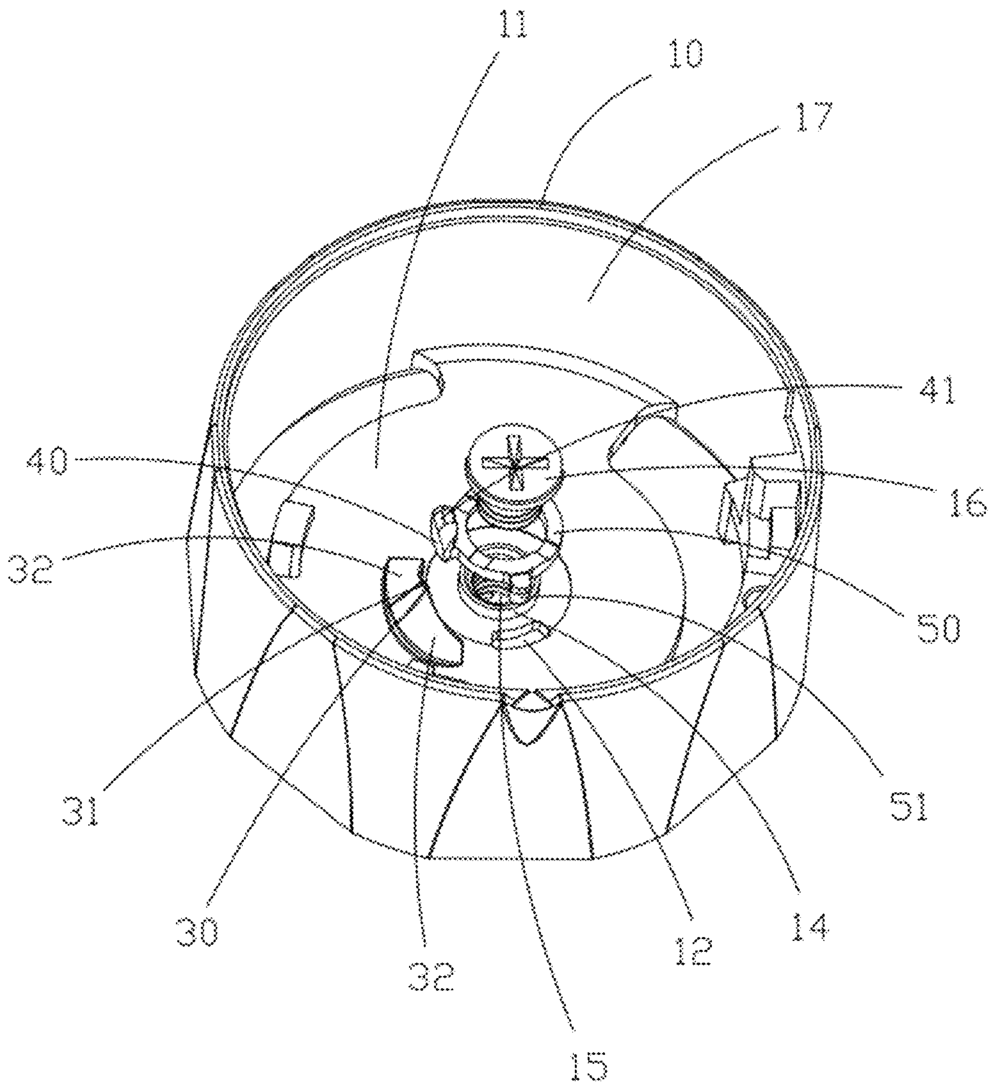
FIG. 3 is a schematic diagram of the knob in the present invention.

Referring to FIG. 3, a pin shaft 14 is provided on the base plate 11. The turntable 50 is fitted over the pin shaft 14. The middle of the pin shaft 14 is provided with a connection hole 15. A fixing bolt 16 is fitted within the connection hole 15. The turntable 50 is connected to the knob 10 through the cooperation of the fixing bolt 16 and the connection hole 15. In use, the turntable 50 is fixed to the pin shaft 14 and can only rotate along the pin shaft 14, without detaching from the pin shaft 14, ensuring the stability of the cipher lock during operation.

Preferably, the turntable 50 is positioned at the center of the base plate 11. The reset cam 30 is located on the outer periphery of the turntable 50. The auxiliary guide block 40 IS positioned on the inner periphery of the reset cam 30. In a preferred embodiment, the pin shaft 14 and the rotational axis of the knob 10 are coaxial, meaning that the knob 10, the turntable 50, the reset cam 30, and the auxiliary guide block 40 can all rotate coaxially.

In a preferred use of the invention, the reset surface 31 of the reset cam 30 and the support surface 41 of the auxiliary guide block 40 can simultaneously engage with the shifting lever 22. This configuration allows the tilting process of the shifting lever 22 to be smoother. In other words, when the shifting lever 22 engages with the reset surface 31, the shifting lever 22 can also engage with the support surface of the auxiliary guide block 40, maintaining the shifting lever 22 in a tilted state. As the knob 10 continues to rotate, the shifting lever 22 disengages from the reset surface 31, but the shifting lever 22 can continue to engage with the support surface of the auxiliary guide block 40, maintaining the tilted state of the shifting lever 22.

Figure 2:
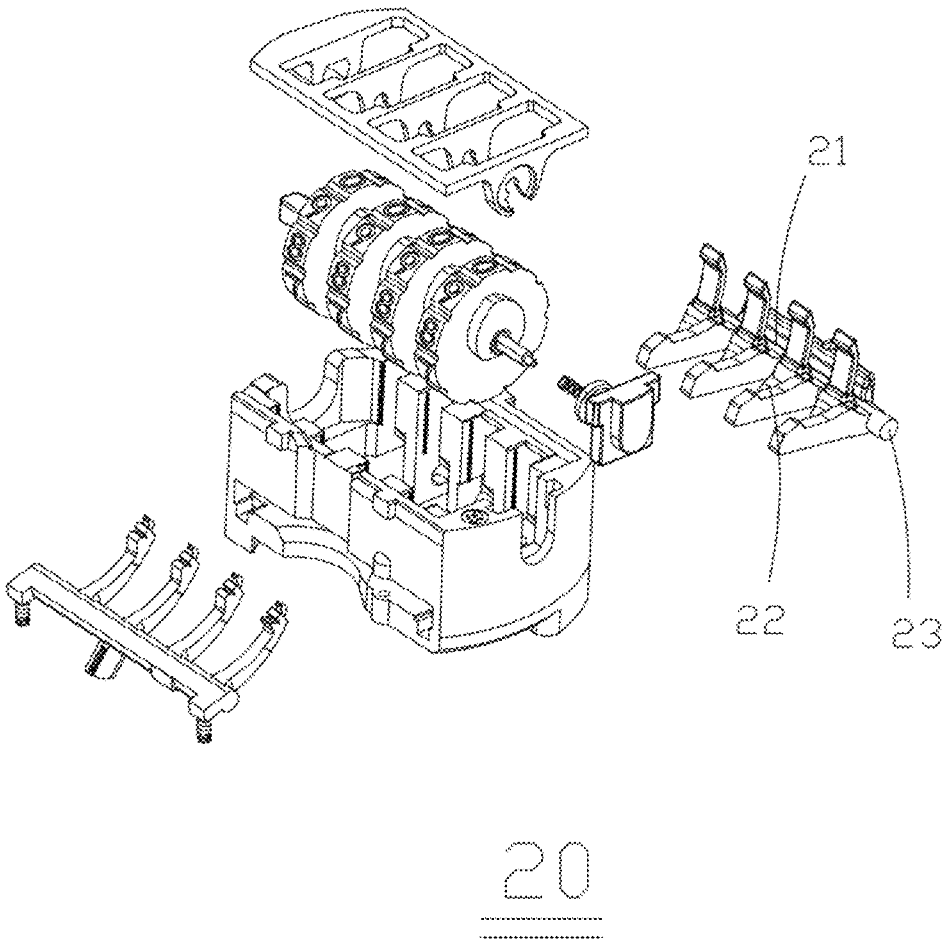
FIG. 2 is a schematic diagram of the cipher wheel assembly in the present invention.

Referring to FIG. 2, the positioning piece 21 includes a rotating shaft 23. The positioning piece 21 is rotatable relative to the cipher wheel assembly 20 when tilted by the cooperation between the shifting lever 22 and the reset cam 30. The rotating shaft 23 is located on the outer periphery of the reset cam 30. In one embodiment of the invention, one end of the shifting lever 22 is connected to the positioning piece 21, while the other end of the shifting lever 22 can be extended to engage with the auxiliary guide block 40.

Referring to FIG. 3, the lower end of the guide surface 32 is connected to the base plate 11. The guide surface 32 is a curved surface. The height of the end of the curved surface 32 near the turntable 50 is higher than the height of the end away from the turntable 50, which facilitates the engagement with the shifting lever 22 to tilt the turntable 50.

Figure 4:
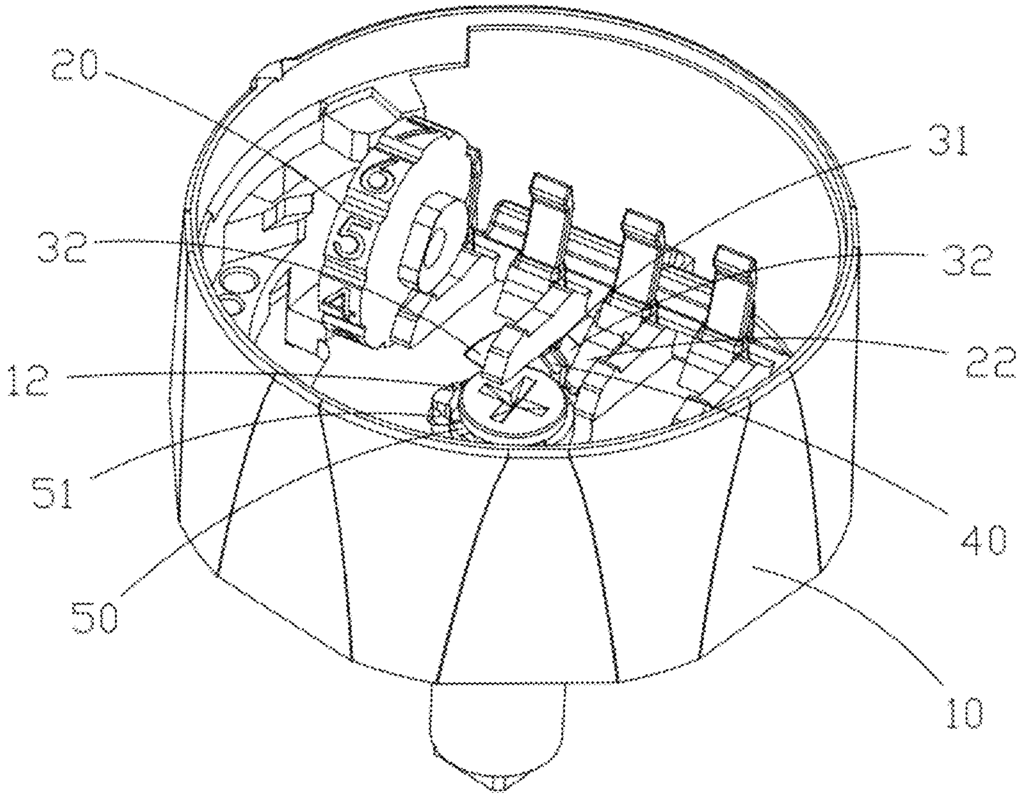
FIG. 4 is a first schematic diagram of the unlocking state in the present invention.
Figure 5:
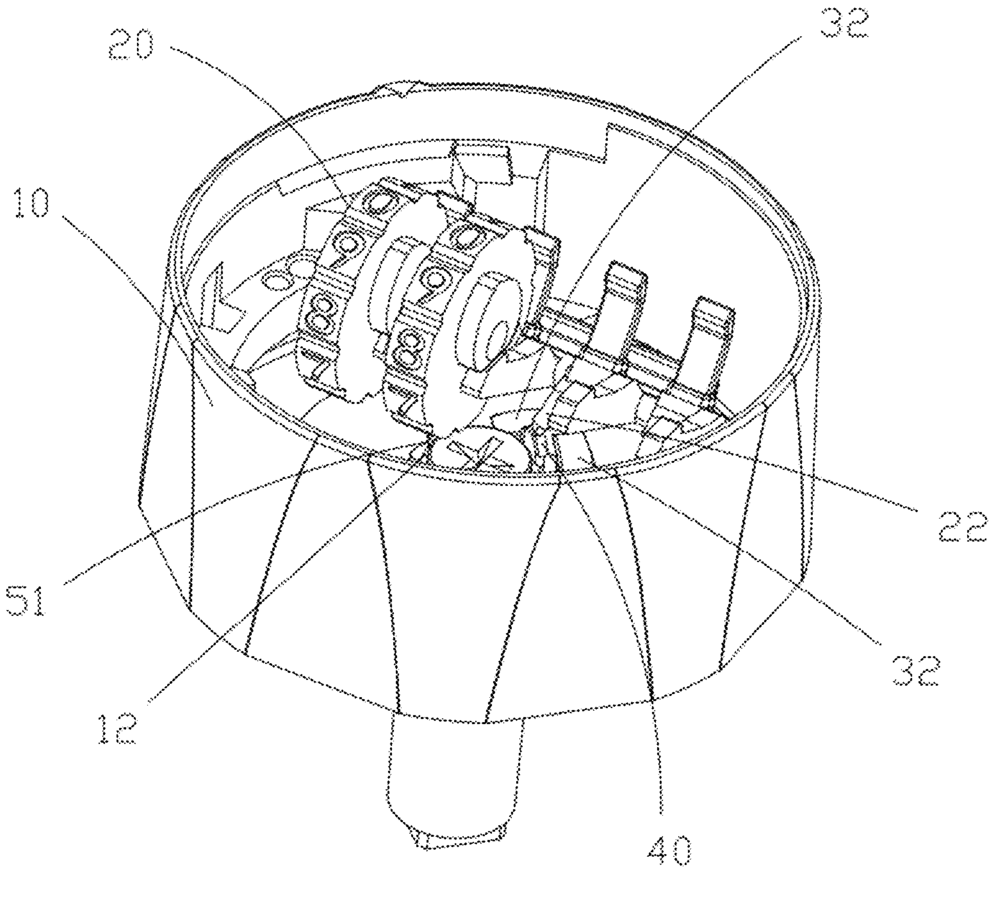
FIG. 5 is a second schematic diagram of the unlocking state in the present invention.
Figure 6:
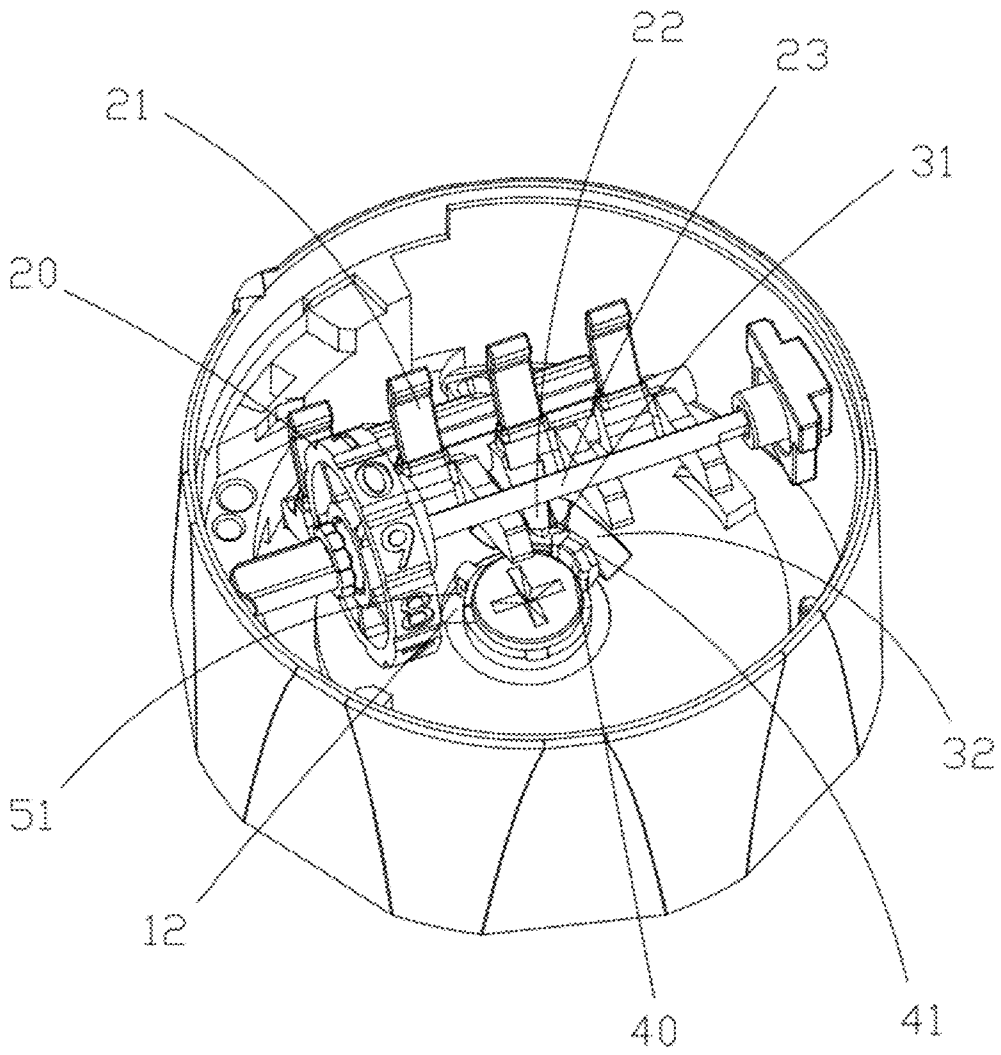
FIG. 6 is a third schematic diagram of the unlocking state in the present invention.

Referring to FIGS. 4-6, which are schematic diagrams of the unlocking process of the cipher lock, the specific process is as follows: In the first state, as shown in FIG. 4, the shifting lever 22 is positioned on the right side of the reset cam 30, engaging with the right-side guide surface 32. At this point, the shifting lever 22 is in abutting engagement with the right side wall of the auxiliary guide block 40. As the knob 10 is rotated to the right, the reset cam 30 also rotates to the right, and under the action of the guide surface 32, the other end of the shifting lever 22 begins to tilt upward. In this state, the auxiliary guide block 40 (or the turntable 50) is rotated relative to the reset cam 30 while the reset cam 30 itself rotates. In the second state, as shown in FIG. 5, the shifting lever 22 reaches the reset surface 31 as the knob 10 continues to rotate. At this moment, the auxiliary guide block 40 and the reset surface 31 of the reset cam 30 are engaged, completing the reset of the cipher wheel assembly 20. Since the action of rotating the knob 10 is continuous and the travel of the shifting lever 22 on the reset surface 31 is short, the auxiliary guide block 40 effectively compensates for the short travel of the shifting lever 22 on the reset surface 31. Even if the knob 10 continues to rotate and the shifting lever 22 disengages from the reset surface 31, the shifting lever 22 can still be supported by the support surface of the auxiliary guide block 40, ensuring that the shifting lever 22 remains in a tilted state. This stability allows the cipher wheel assembly 20 to be properly reset, such as displaying "0" on all four cipher wheels, avoiding inaccuracies caused by inertia, such as the wheels resetting to "1" or "9" or somewhere between "0 and 1" or "0 and 9." When the limiting protrusion 51 engages with one end of the connection slot 12, further rotation of the knob 10 causes the auxiliary guide block 40 to rotate together with the reset cam 30 to the right until the other end of the shifting lever 22 disengages from the support surface of the auxiliary guide block 40. At this point, as shown in FIG. 6, the shifting lever 22 is engaged with the left-side guide surface 32. Continued rotation of the knob 10 causes the shifting lever 22 to slide down the left-side guide surface 32, completing the unlocking process, with the shifting lever 22 now positioned on the left side of the auxiliary guide block 40.

Figure 7:
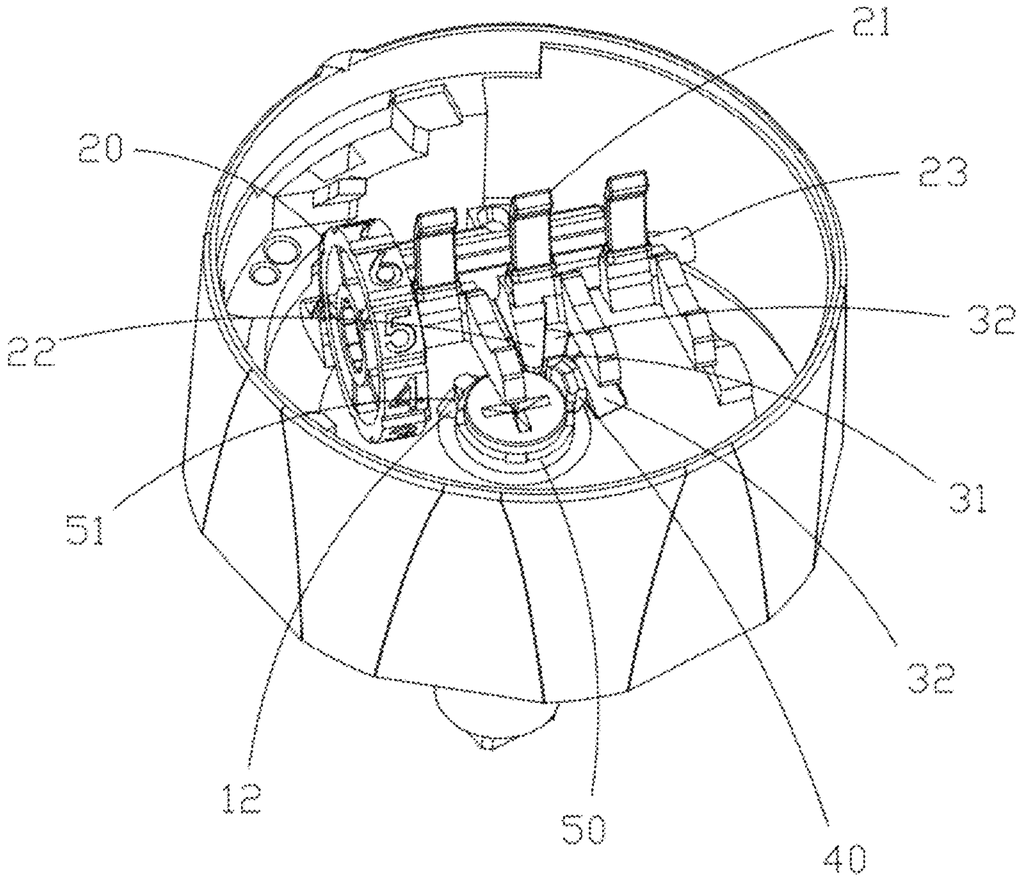
FIG. 7 is a first schematic diagram of the locking state in the present invention.
Figure 8:
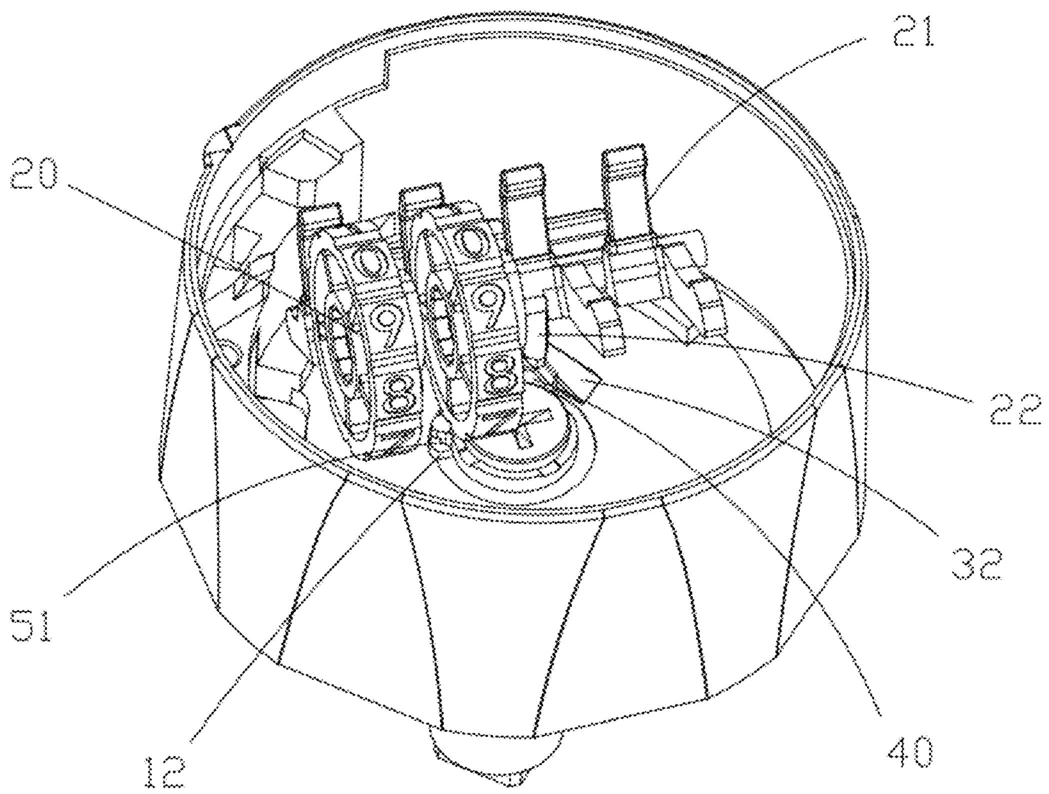
FIG. 8 is a second schematic diagram of the locking state in the present invention.
Figure 9:
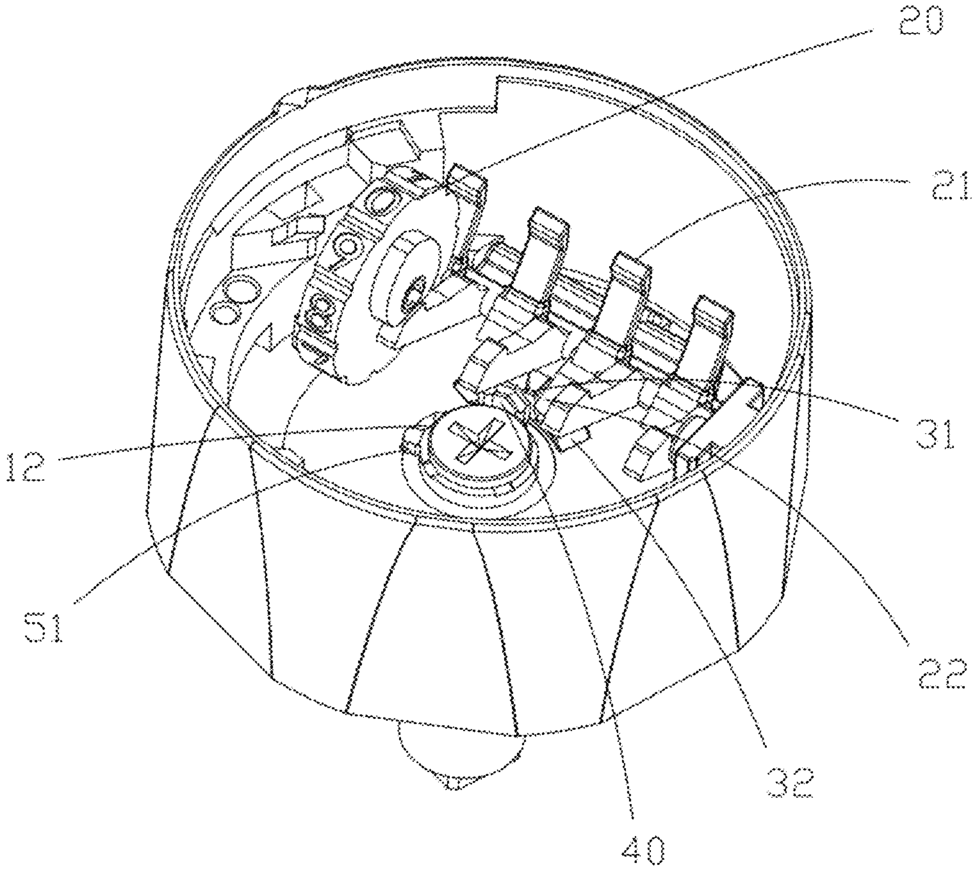
FIG. 9 is a third schematic diagram of the locking state in the present invention.
Figure 10:
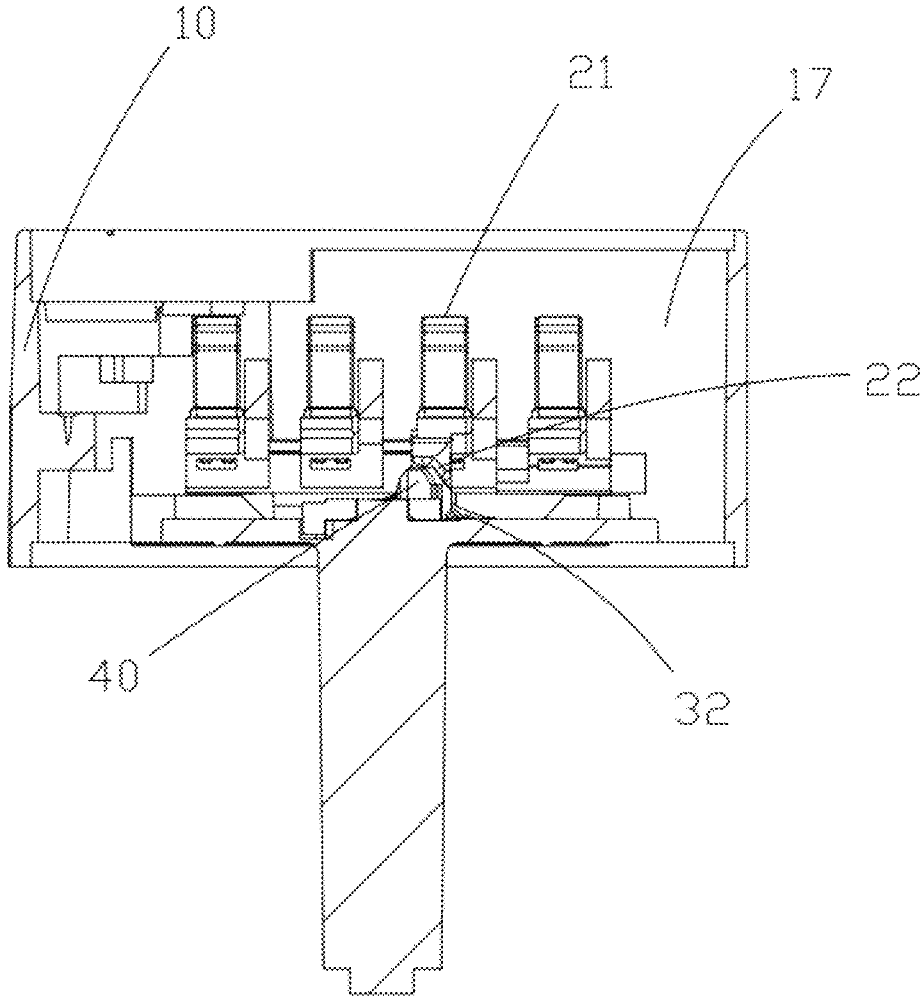
FIG. 10 is a first sectional view of the present invention.
Figure 11:
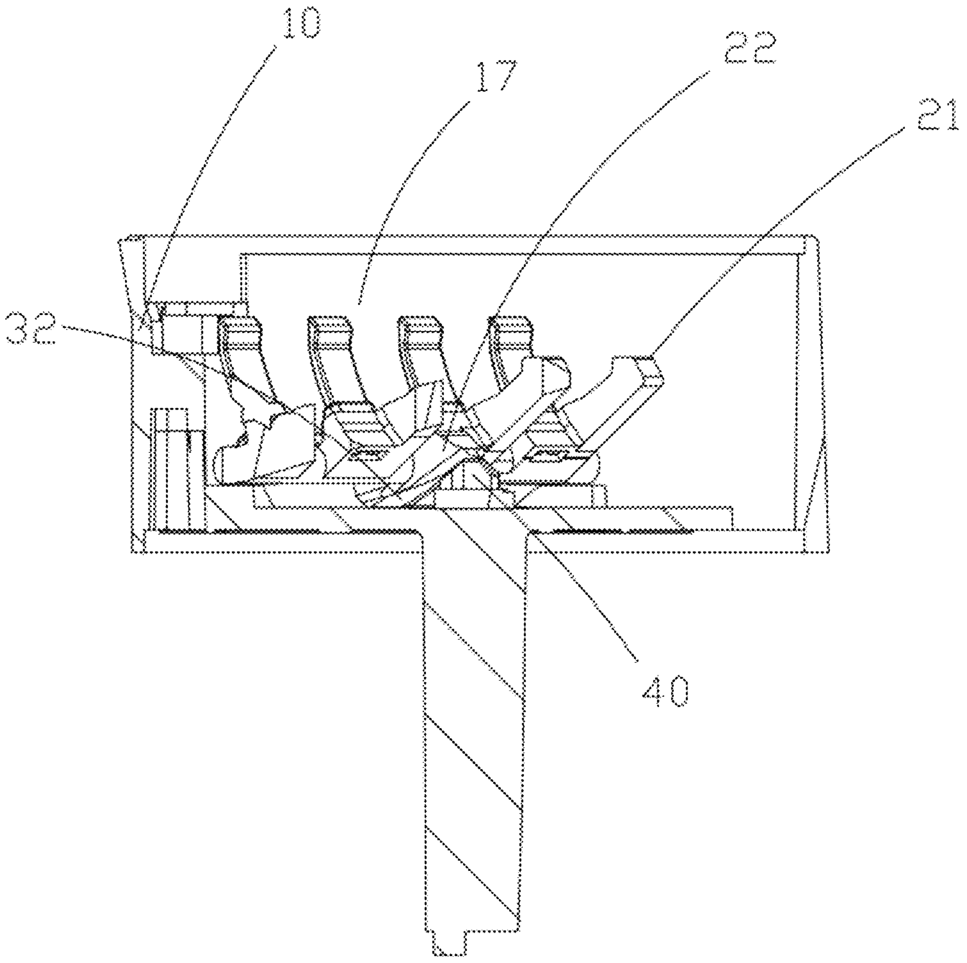
FIG. 11 is a second sectional view of the present invention.
Figure 12:
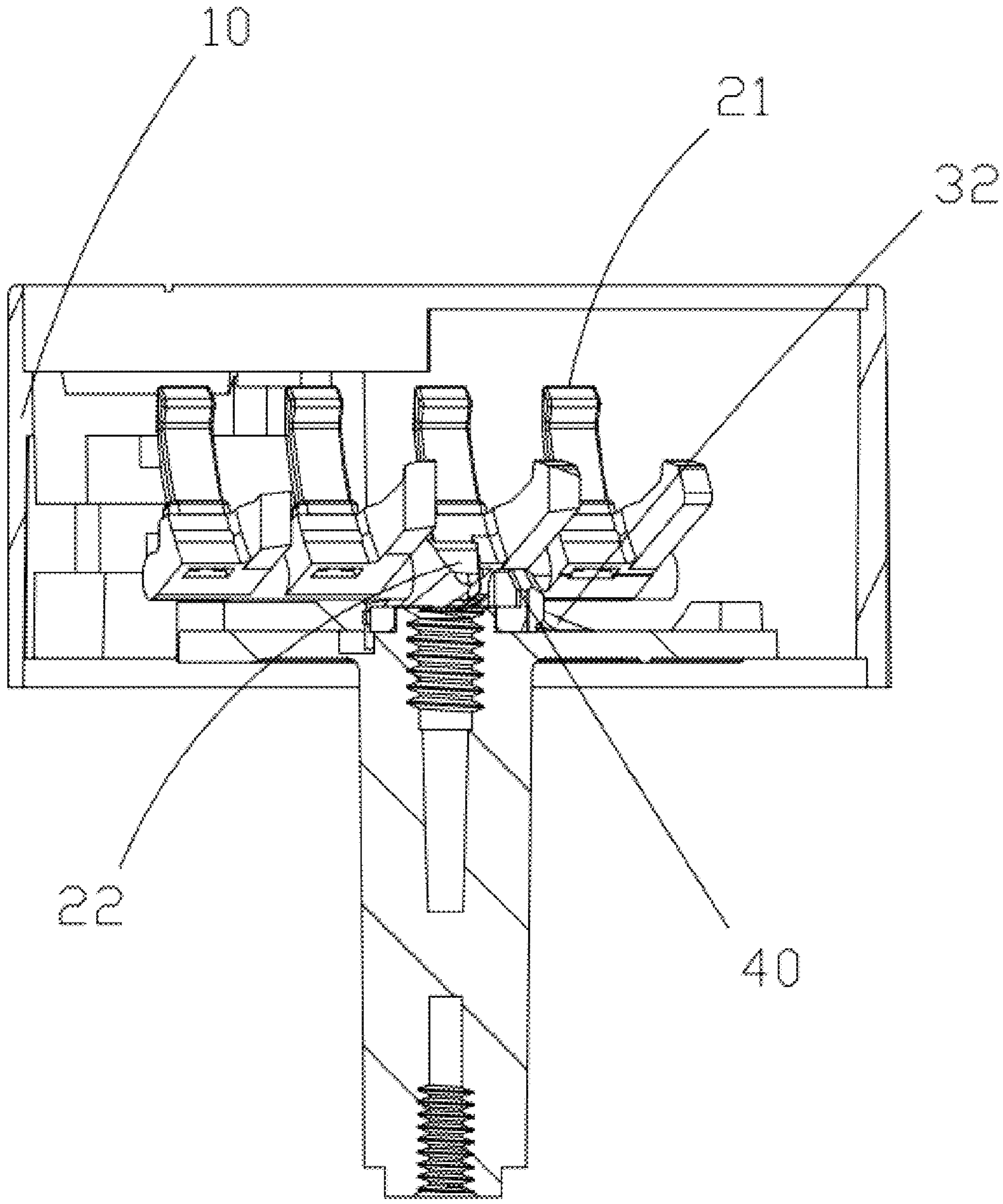
FIG. 12 is a third sectional view of the present invention.

Referring to FIGS. 7-9, which are schematic diagrams of the locking process of the cipher lock, the process is the reverse of the unlocking process. Specifically, as shown in FIG. 7, the shifting lever 22 is positioned on the left side of the reset cam 30, engaging with the left-side guide surface 32. As the knob 10 is rotated to the left, the reset cam 30 also rotates to the left, and under the action of the guide surface 32, the other end of the shifting lever 22 begins to tilt upward. Referring to FIG. 8, at this point, the shifting lever 22 engages with the reset surface 31 and the support surface of the auxiliary guide block 40 as the knob 10 continues to rotate. When the limiting protrusion 51 is engaged with one end of the connection slot 12, further rotation of the knob 10 causes the auxiliary guide block 40 to rotate together with the reset cam 30 to the left until the other end of the shifting lever 22 is disengaged from the support surface of the auxiliary guide block 40. Referring to FIG. 9, the shifting lever 22 is engaged with the right-side guide surface 32. Continued rotation of the knob 10 causes the shifting lever 22 to slide down the right-side guide surface 32, completing the locking process, and returning to the initial state of the unlocking process, with the shifting lever 22 positioned on the right side of the auxiliary guide block 40.

In the present invention, the short length of the reset surface helps prevent the cipher wheel assembly 20 from getting stuck. To ensure that the shifting lever 22 remains in a tilted state for a sufficient duration during continuous rotation, an auxiliary support is needed to maintain the accuracy of the cipher wheel assembly's reset.

The above description illustrates and describes the preferred embodiments of the present invention. As previously stated, it should be understood that the invention is not limited to the forms disclosed herein and should not be construed as excluding other embodiments. Rather, it is applicable to various other combinations, modifications, and environments, and changes can be made within the scope of the utility model concept described herein, using the above teachings or related knowledge in the field. Any modifications and variations made by those skilled in the art without departing from the spirit and scope of the invention should fall within the protection scope of the appended claims of the present invention.

What is claimed is:

1. A reset auxiliary structure for cipher wheel locks, comprising:
- a knob (10);
- a cipher wheel assembly (20) rotatable relative to the knob (10);
- a reset cam (30); and
- an auxiliary guide block (40);
- wherein the knob (10) is centrally provided with a receiving chamber for accommodating the cipher wheel assembly (20);
- wherein the cipher wheel assembly (20) includes a positioning piece (21) and a shifting lever (22) disposed on the positioning piece (21);
- wherein the reset cam (30) is synchronously rotatable with the knob (10); the reset cam (30) includes a reset surface (31) and guide surfaces (32) connected to the reset surface (31); the guide surfaces (32) are disposed on two sides of the reset surface (31), and the reset surface (31) is positioned at a highest point of the reset cam (30);
- wherein the auxiliary guide block (40) is movable relative to the reset cam (30); and a support surface of the auxiliary guide block (40) is positioned beside the reset surface (31);
- wherein the shifting lever (22) is operatively connected with the reset cam (30);
- wherein after being tilted by the guide surfaces (32), the shifting lever (22) is engaged with both the reset surface (31) and the support surface of the auxiliary guide block (40); and
- wherein a side wall of the auxiliary guide block (40) is in abutting engagement with a side wall of the shifting lever (22), and when the shifting lever (22) tilts on the guide surfaces (32), the auxiliary guide block (40) is displaced relative to the reset cam (30).

2. The reset auxiliary structure for cipher wheel locks according to claim 1, further comprising a turntable (50);
- wherein the turntable (50) is rotatable relative to the reset cam (30); and
- wherein the auxiliary guide block (40) is operatively connected to the turntable (50).

3. The reset auxiliary structure for cipher wheel locks according to claim 2, wherein the knob (10) comprises a base plate (11); and
- wherein the turntable (50) is rotatably connected to the base plate (11); the reset cam (30) is arranged on the base plate (11).

4. The reset auxiliary structure for cipher wheel locks according to claim 3, wherein the base plate (11) is provided with a connection slot (12); the turntable is provided with a limiting protrusion; and
- wherein the limiting protrusion is positioned within the connection slot (12).

5. The reset auxiliary structure for cipher wheel locks according to claim 3, wherein a peripheral side of the turntable (50) is provided with a limiting groove (52); the base plate (11) is provided with a limiting block (13); and wherein the cooperation between the limiting block (13) and the limiting groove (52) restricts the rotational angle of the turntable (50).

6. The reset auxiliary structure for cipher wheel locks according to claim 4, wherein a pin shaft (14) is provided on the base plate (11); the turntable (50) is fitted over the pin shaft (14); the middle of the pin shaft (14) is provided with a connection hole (15); a fixing bolt (16) is fitted within the connection hole (15); and wherein the turntable (50) is connected to the knob (10) through the cooperation of the fixing bolt (16) and the connection hole (15).

7. The reset auxiliary structure for cipher wheel locks according to claim 6, wherein the turntable (50) is positioned at a center of the base plate (11); the reset cam (30) is located on an outer periphery of the turntable (50); the auxiliary guide block (40) is located on the inner periphery of the reset cam (30); and wherein the reset surface (31) of the reset cam (30) and the support surface of the auxiliary guide block (40) are simultaneously engaged with the shifting lever (22).

8. The reset auxiliary structure for cipher wheel locks according to claim 1, wherein the positioning piece (21) includes a rotating shaft (23); and wherein the positioning piece (21) is rotatable relative to the cipher wheel assembly (20) when tilted by the cooperation between the shifting lever (22) and the reset cam (30).

9. The reset auxiliary structure for cipher wheel locks according to claim 8, wherein the rotating shaft (23) is located on an outer periphery of the reset cam (30);

a lower end of the guide surface (32) is connected to a base plate (11); and wherein the guide surface (32) is a curved surface.

* * * * *